(No Model.)
E. D. AVERELL.
RAISIN PUNCTURING MACHINE.
No. 574,470. Patented Jan. 5, 1897.
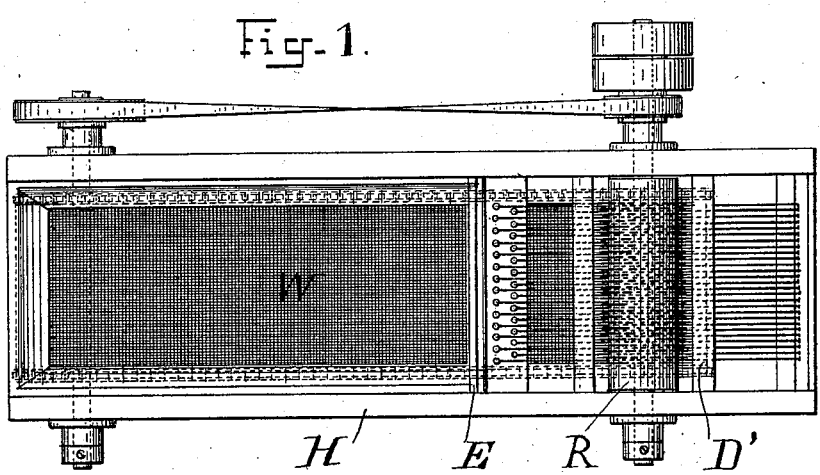
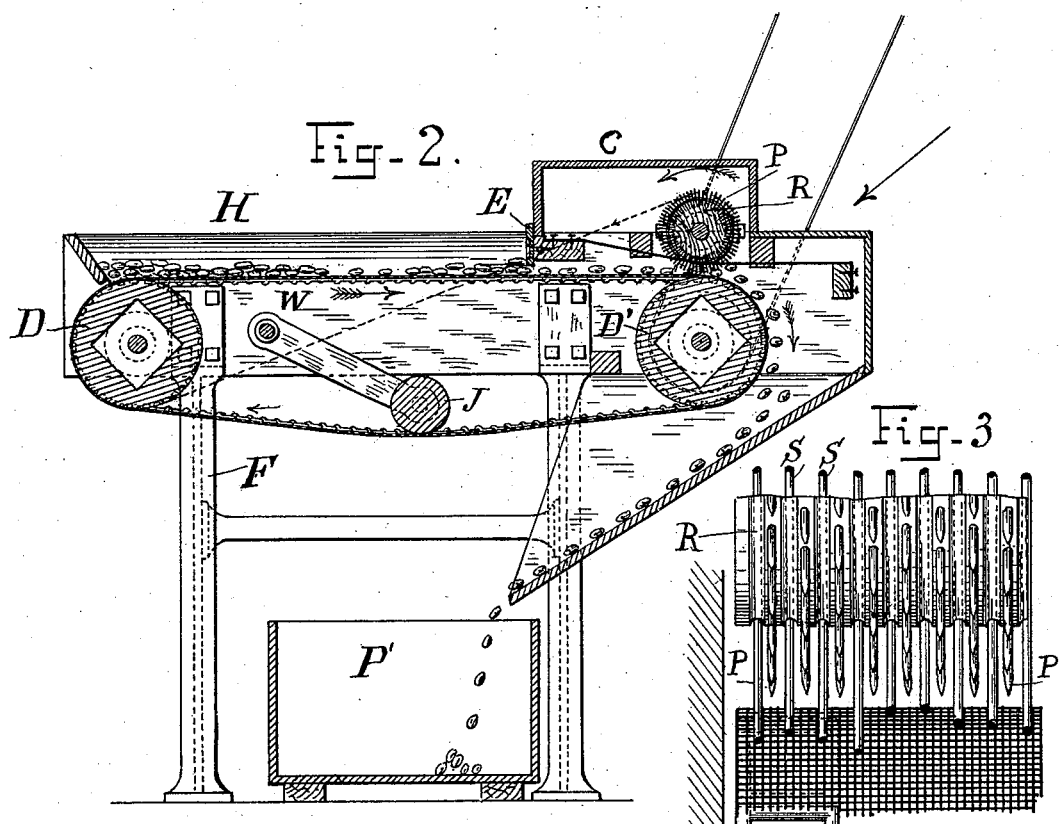
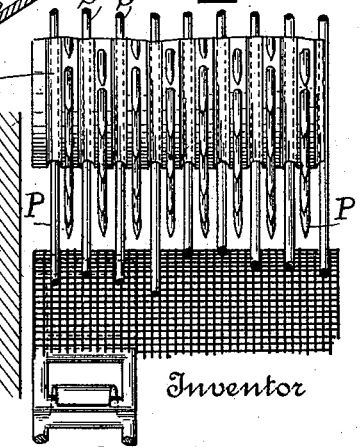
Witnesses
Chas. Hanimann,
Edward S. Berrall.
Inventor

UNITED STATES PATENT OFFICE.

ELLICOTT D. AVERELL, OF BROOKLYN, NEW YORK, ASSIGNOR, BY MESNE ASSIGNMENTS, TO THE SANITAS DRIED FRUIT COMPANY OF NEW YORK, OF NEW YORK.

RAISIN-PUNCTURING MACHINE.

SPECIFICATION forming part of Letters Patent No. 574,470, dated January 5, 1897.

Application filed November 28, 1894. Serial No. 530,271. (No model.)

*To all whom it may concern:*

Be it known that I, ELLICOTT D. AVERELL, a citizen of the United States, residing in the city of Brooklyn, county of Kings, and State of New York, have invented a new and useful Raisin-Puncturing Machine, of which the following is a specification.

My invention relates to a machine for puncturing the skins of raisins in quantity preparatory to seeding, the punctures or holes being made on and through the skin of one side to furnish an artificial outlet for the seed where it does not find a natural one during the seeding operation.

The nature of my invention is set forth in the claims hereto annexed and is shown in the drawings, in which—

Figure 1 is a top view, Fig. 2 a vertical lengthwise sectional view, and Fig. 3 a partial end view.

Similar letters relate to similar parts throughout the several views.

Certain kinds of raisins, having skins that are thick, tough, and strong, require preparatory treatment by puncturing in order to furnish an outlet for the seeds and to facilitate the seeding, so that it may be done more speedily and effectually, with less rolling and pressing, by shorter working surfaces in the seeding-machine, and with less loss of pulp in the process. Certain other kinds of raisins, having skins that are thin, tender, and weak, require no puncturing, since the seeds more easily make their own exit-openings under or during the seeding treatment. Between these extremes raisins vary in their condition and requirements.

The absence of puncturing or amount of puncturing required depends upon the character, quality, and condition of the fruit, its ripeness or unripeness, &c. In some instances it may be necessary, even, to puncture the raisins on more than one side, while in others it will be found sufficient to puncture only on and from one side. Where the condition of the fruit requires, it may be punctured on more than one side by putting it through the machine more than once and as many times as required.

I am aware that many inventions have been made for the purpose of seeding raisins by puncturing the raisins in such a manner as to push the seeds out on the needle ends at the side opposite to that on which the pins or needles enter. My invention has no such purpose or method, but its puncturing is only preliminary to seeding, which last is done in another machine and by another method of operation, to which this method and invention are preparatory; and further, its object is to make openings or holes through which the seeds may escape, if they do not escape at the stem end, where the skin is originally open, or at least not continuous or most easily opened in and during the process of seeding by rolling.

Water is used to facilitate the seeding by relieving the tendency of the raisins to stick to the pins or needles, and also by softening the pulp and freeing the seed from its naturally tenacious engagement with the surrounding pulp.

F is the frame.

D and D' are two drums which carry an endless belt, made of wire-cloth or other suitable material, for carrying the raisins under the puncturing wheel or device, provided with sprocket-chains on the sides or edges and engaging the drums at the ends.

H is the hopper, holder, or bottomless tray in or through which the raisins are fed onto the endless belt W, which takes them therefrom and carries them in the direction shown by the arrow, under the pricking or puncturing roller R, which is provided with small pointed pins P, placed about a quarter of an inch apart, and moves in such relation, as shown by the arrow, as to puncture the raisins by pressing the pins or needles upon and into them while they are passing over the drum D', carried by the belt W. The pointed pins or needles are made of such length as to barely clear the belt and practically and preferably so as to puncture the raisins on one side only.

C is a box or cover for the pricking-roller. The shaft of the pricking-roller may be supported in adjustable bearings, so as to vary or adjust the action of the points upon the raisins. The strings or wires S are so strung, being secured at each end, as to always lie between the rows of pins on the pricking-roller R, which project through and beyond them, so as to reach and penetrate the fruit below them on the belt or carrier. These strings or wires either bear slightly in the grooves of the pricking-roller, as shown in Fig. 3, or they approximately touch the roller at those points continuously as the roller revolves, their function being to strip the raisins from the sharp puncturing-pins if they adhere thereto as the pricking-roller revolves, as shown in Fig. 2. Contact with the wires S made by the raisins that adhere to the pins will, as the roller R revolves, strip the raisins from the pins. Being so stripped, they drop downward in the direction indicated by the arrow toward and into any usual receptacle P' placed to receive them; but the raisins will to a greater or less extent be engaged, held, and carried along and stripped from the pins by the carrier-belt W. Having been punctured in this way, whether subsequently seeded or not, the raisins are in an improved condition for culinary uses, as the characteristic juice or flavor of the raisins may pass through these openings made in the skin into the substance of the cake or pudding or other article in which they may be used. The tendency of the raisins to stick to the pins or needles will be diminished if either the raisins or the needles are moistened with water.

The pins or needles will of course first and most frequently puncture the raisin in its thickest part, and the needles, being moistened, will, in the act of puncturing, conduct and apply a modicum of the moistening fluid to the pulp at or adjacent to the seeds, where the raisin is thickest on account of the presence of the seeds, and thereby soften the pulp about or near to them and prepare it to release the seeds and facilitate their escape through the skin in a comparatively clean condition, that is, comparatively free from pulp, and leaving the pulp behind them in the skin of the raisin. When the raisins themselves are moistened, a modicum of that moisture will run or follow the needles into the pulp or into the holes made by the needles, sooner or later, with similar effects upon the seeds and the adjacent portion of the pulp; and in whatever way the water may be introduced within the skin and brought into contact with the pulp and seeds it prepares the pulp and the seeds for the seeding operation by making the pulp softer and more yielding than before, with less kneading, or without kneading the pulp and without breaking up or displacing the cells and other structure of all the pulp in the raisin. The moisture coming in contact with the seeds also helps to clear them of pulp, to make them more slippery, and to facilitate their escape from the skins of the raisins when they are put into the proper seeding-machine, and for which the process of puncturing is preliminary. The moisture may be applied to the needles, or to the raisins in the manner shown in my application Serial No. 494,955, or in any other suitable way.

Not all raisins will be required to be punctured or pricked, because raisins in certain conditions, as stated, may be seeded by rolling and rubbing under slight pressure, so as to work the seeds out at the natural outlet at the stem end; but in raisins of a different condition it is sometimes desirable to give a more direct route for the seeds out of the raisins by puncturing them, particularly where the skin is tough, and also where the pulp of the raisin is in such condition as to call for the least possible amount of rolling, pressing, and rubbing. The idler J maintains the tension of the belt W. The distributer E prevents the raisins passing under the pricking-roller in bulk or mass, or on top of one another, and spreads the raisins in one layer or thickness for puncturing. I have shown the distributer E as located at some distance from the pricking-roller, but it may be located nearer the roller, if desired, or still farther away; but in whatever position it is placed it is to perform the function of disposing the raisins in a single layer—that is, not one on top of another—and to guide the raisins to the pins or needles so as to be punctured thereby as they are carried over the wheel D' by the endless belt W. The raisins therefore pass under the roller in a single layer.

The speed of the belt and that of the surface of the pricking-roller should preferably correspond as nearly as possible, and the pins should project through or beyond the stripping-wires and perform the operation of puncturing the raisins below them, so as to enable the wires to strip the raisins from the pins.

Since different kinds of raisins and samples of raisins have different sizes and quantities of seeds, it is necessary to accommodate the number and juxtaposition of the pins or needles somewhat thereto, and particularly to avoid placing the needles so close together as to punch the seeds out of the raisins on the opposite sides or to crush them by engaging them between the needles and the belt and drum in such a way that they cannot escape and must be crushed. The pins or needles may therefore be separated more or less than a quarter of an inch, and so as to enter the raisin and pass between the seeds, and even if they are arranged so as to strike the seeds without crushing them, and only so as to move them to one side, no harm will be done; and the later process of seeding may be facilitated where the seeds are simply moved out of their natural positions within the raisin by such action of the needles. Engagement of the seeds on the points of the pins or needles and crushing of them between the pins or needles and the carrier-belt W and drum D' will be checked or prevented by the termination of the needles a sufficient distance above the surface of the belt, by the meshes in the belt, into which the seeds may sink sufficiently, and by the freedom of movement of the seeds within the pulp, so that when first struck by a needle anywhere on their rounded sides they will be moved out of the way, unless in the very rare cases where the needle first engages the seed in some indentation and the seed is caught on the opposite side by some part of the belt that will prevent its reaching a mesh or turning out of the way. The belt being made of round wire, preferably, will facilitate the turning aside and the escape of the seed from crushing pressure when in contact with a pin or needle point, unless held and prevented by an adjacent needle; and this holding should be avoided by keeping them far enough apart to avoid engaging two or more needles with a seed at the same time.

Some raisins that are put on the market, or raisins of some kinds and conditions, require additional treatment or assistance in getting rid of their seeds.

I claim as my invention—

1. In combination the pricking-roller R, endless carrying-belt W and drums D and D', the drum D' being located directly under the pricking-roller R and supporting the carrying-belt at the place where they approach each other and where the pricking-roller R performs the function of pricking the raisins, as and for the purpose shown.

2. In combination the pricking-roller R, endless carrying-belt W and drums D and D', the drum D' being located directly under the pricking-roller R and supporting the carrying-belt at the place where they approach each other and where the pricking-roller R performs the function of pricking the raisins, together with stripping-wires S located between the rows of pins or needles.

3. In combination the pricking-roller R, endless carrying-belt W and drums D and D', the drum D' being located directly under the pricking-roller R and supporting the carrying-belt at the place where they approach each other and where the pricking-roller R performs the function of pricking the raisins, together with stripping-wires S stretched between the rows of pins or needles and between the roller R and the drum D'.

4. In combination the hopper H, distributer E, endless carrier-belt W, pricking-roller R, drums D and D', the drum D' located under the roller R and supporting the carrier-belt at the point and in the act of pricking, and stripping-wires located between the rows of pins or needles for the purpose of stripping the raisins from the same.

ELLICOTT D. AVERELL.

Witnesses:
FRANCIS J. FLYNN,
EDWARD S. BERRALL.